(12) United States Patent
Aalto et al.

(10) Patent No.: US 8,797,947 B2
(45) Date of Patent: Aug. 5, 2014

(54) PACKET FORWARDING IN TELECOMMUNICATION NETWORK

(75) Inventors: Mika Maurits Aalto, Espoo (FI); Matti Einari Laitila, Oulu (FI); Seppo Ilmari Vesterinen, Oulunsalo (FI)

(73) Assignee: Nokia Siemens Networks Oy, Espoo (FI)

( * ) Notice: Subject to any disclaimer, the term of this patent is extended or adjusted under 35 U.S.C. 154(b) by 737 days.

(21) Appl. No.: 12/673,025

(22) PCT Filed: Aug. 13, 2008

(86) PCT No.: PCT/EP2008/060615
§ 371 (c)(1),
(2), (4) Date: Mar. 19, 2010

(87) PCT Pub. No.: WO2009/024508
PCT Pub. Date: Feb. 26, 2009

(65) Prior Publication Data
US 2011/0205959 A1    Aug. 25, 2011

(30) Foreign Application Priority Data
Aug. 17, 2007    (FI) ..................................... 20075578

(51) Int. Cl.
| | |
|---|---|
| H04W 4/00 | (2009.01) |
| H04W 8/08 | (2009.01) |
| H04L 12/56 | (2006.01) |
| H04W 84/10 | (2009.01) |
| H04W 80/04 | (2009.01) |

(52) U.S. Cl.
CPC ............ *H04W 8/082* (2013.01); *H04W 84/105* (2013.01); *H04W 80/04* (2013.01); *H04L 45/22* (2013.01); *H04L 45/00* (2013.01)
USPC .......................................... 370/328; 370/338

(58) Field of Classification Search
USPC .................................................. 370/328, 338
See application file for complete search history.

(56) References Cited

U.S. PATENT DOCUMENTS

| | | | |
|---|---|---|---|
| 6,359,879 B1 * | 3/2002 | Carvey et al. .................. | 370/351 |
| 6,535,493 B1 * | 3/2003 | Lee et al. ....................... | 370/329 |
| 6,633,542 B1 | 10/2003 | Natanson et al. .............. | 370/235 |
| 2003/0108036 A1 * | 6/2003 | Henry et al. ................... | 370/356 |
| 2005/0286500 A1 * | 12/2005 | Minami ......................... | 370/352 |
| 2007/0195791 A1 * | 8/2007 | Bosch et al. ............. | 370/395.52 |
| 2009/0197597 A1 * | 8/2009 | Kotecha ......................... | 455/433 |
| 2009/0286540 A1 * | 11/2009 | Huber et al. ................ | 455/435.1 |

* cited by examiner

*Primary Examiner* — Noel Beharry
*Assistant Examiner* — Kodzovi Acolatse
(74) *Attorney, Agent, or Firm* — Harrington & Smith (57) ABSTRACT

A solution for rearranging data transfer in a telecommunication network is provided. Accordingly, a data packet related to a first logical connection and originating from a first user terminal is received in a network node of a first logical connection associated with a first user terminal and a second logical connection associated with a second user terminal in a telecommunication network, wherein the data packet is addressed to the second user terminal. Then, the network node checks for an intermediate network node common to both the first logical connection and the second logical connections, and arranges a shortcut between the first and the second logical connection through the intermediate network node, if the common intermediate network node has been detected.

33 Claims, 4 Drawing Sheets

PACKET FORWARDING IN TELECOMMUNICATION NETWORK

FIELD

The invention relates to conveying data packets in a telecommunication network including wired and wireless communication links within logical connection established in the telecommunication network.

BACKGROUND

In order to provide a wireless broadband access and high data transfer rates at homes, base stations deployed at homes and communicating with user terminals have been available in the markets for some time. Wireless base stations or routers communicating with user terminals according to the IEEE 802.11x standard (Wireless Local Area Network or Wi-Fi) have been available for years but, recently, private base stations communicating according to cellular radio telecommunication standards have entered the markets. The private base stations are typically associated with uncoordinated deployment, i.e. the network infrastructure and coverage of a cellular telecommunication system is not based on the geographical deployment of the private base stations. A private base station may be called by many names, including Home Base Station, Home NodeB, femto eNodeBs, or simply Home Access, and it has become a popular topic within operator and manufacturer communities.

The private base station is a consumer product for uncoordinated deployment, which is not under the control of an operator of a cellular network. The private base station may be located on a different frequency layer than public base stations. For example, one frequency layer of 5 MHz in W-CDMA (Wide-Band Code Division Multiple Access) may be used in a public cell and a separate frequency layer for the private deployment, the private base station being also potentially intended to serve as a public capacity enhancement layer.

It can be assumed that an end-user buys an economic private base station and installs the private base station as a physical entity at his home. The private base station then provides coverage and service to user equipment registered by the owner of the private base station. The private base station may be connected via a DSL (Digital Subscriber Line) and via a core network of the operator towards the Internet. The core network of the operator typically comprises one or more network nodes providing the user equipment with IP (Internet Protocol) connection. In more detail, data packets sent/received by the user equipment are transferred between the user equipment and a peer entity (for example an Internet server or another user equipment) through the one or more network nodes.

BRIEF DESCRIPTION

According to an aspect of the present invention, there is provided a solution for rearranging and optimizing data transfer within a telecommunication network in order to increase the capacity of the network.

According to an aspect of the invention, there are provided methods as specified in independent claims 1 and 35.

According to another aspect of the invention, there are provided apparatuses as specified in independent claims 16, 31, 32, and 34.

According to yet another aspect of the invention, there is provided a computer program product as specified in independent claim 33.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
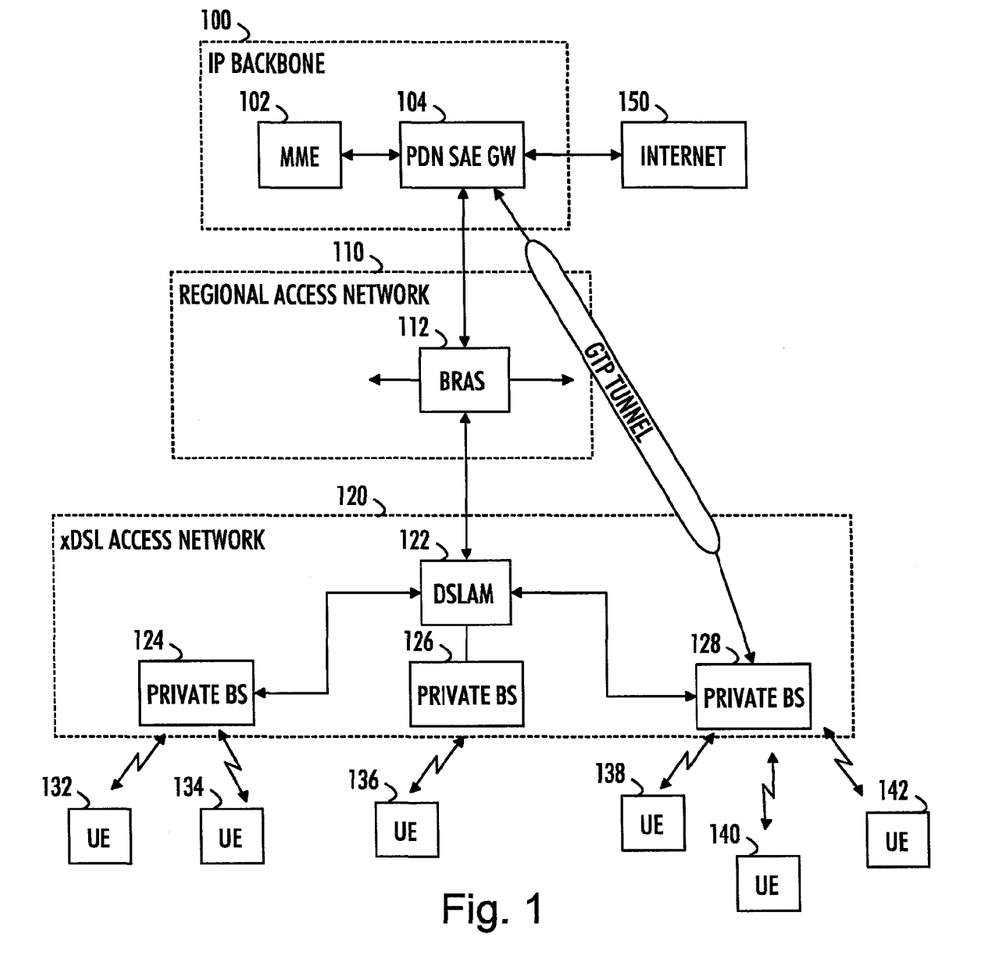
FIG. 1 illustrates an example of network architecture for providing IP services to user equipments served by private base stations.

A general architecture of a mobile telecommunication network providing wireless voice and packet switched data transfer services to user terminals through one or more private base stations connected to the telecommunication network is illustrated in FIG. 1. FIG. 1 is a simplified system architecture only showing some elements and functional entities of the network, all being logical units whose implementation may differ from what is shown. It is apparent to a person skilled in the art that the mobile telecommunication systems also comprise other functions and structures.

The mobile telecommunication network may comprise a fixed part including a plurality of network nodes connected to each other through wired connections and configured to convey data associated with user terminals served by the network. The network of the mobile telecommunication system may provide connections to other networks, such as the Internet 150. The mobile telecommunication network further comprises one or more private base stations 124, 126, 128 connected to at least one of the network nodes and providing a wireless radio connection to user terminals 132 to 142 within a coverage area of the private base stations 124, 126, 128. The coverage area is typically referred to as a cell. User terminals 132 and 134 illustrated in FIG. 1 are served by a first private base station 124, user terminal 136 is served by a second private base station, and user terminals 138, 140, and 142 are served by a third private base station.

The radio interface between the private base stations 124 to 128 and the user terminals 132 to 142 may be implemented according to the standardized specifications of a public mobile telecommunication system. In more detail, the radio interface may be a long-term evolution of a $3^{rd}$ generation mobile communication system, such as Universal Mobile Telecommunication System (UMTS) standardized within $3^{rd}$ Generation Partnership Project (3GPP), and having a widespread infrastructure of public base stations (not shown). The radio interface may, however, be implemented according to specifications of another mobile telecommunication system having a fixed infrastructure of public base stations connected to a fixed network of an operator maintaining the infrastructure and providing communication services within the coverage area of the system.

At this stage, there is defined a discrimination between public base stations and private base stations. The difference between the private and the public base station is that the public base station is (under normal conditions) accessible to any user terminal located within the coverage area of the public base station. On the other hand, a private base station is the property of an individual user and, as a consequence, the private base station is dedicated to provide radio connections to a limited number of user terminals registered into the private base station. In other words, the owner of the private base station may configure the private base station to provide a radio connection only to specific user terminals defined by IDs of the user terminals and/or SIMs (Subscriber Identity Module) attached to the user terminals.

The private base stations 124, 126, 128 illustrated in FIG. 1 are connected to the wired network through an xDSL (Digital Subscriber Line) connection. The xDSL connection may be an asynchronous DSL connection (ADSL) or a very-high-data-rate DSL (VDSL) connection, for example. The private base stations 124, 126, 128 may be connected to a DSL access multiplexer 122 which is located in an xDSL access network 120 near the location of the private base stations and configured to connect a plurality of DSL connections of the xDSL access network to other parts of the telecommunication network by way of multiplexing techniques. In the exemplary architecture of FIG. 1, the DSL access multiplexer 122 connects the private base stations to a regional access network 110 of an operator managing the telecommunication network. In particular, the DSL access multiplexer 122 terminates the DSL connections and forwards data packets to a broadband access server 112 aggregating data packets transferred over multiple subscriber connections and forwarding the data packets towards their actual destination addresses. The broadband access server 112 may aggregate subscriber connections also from other DSL access networks other than the xDSL access network 120 illustrated in FIG. 1. The DSL access multiplexer 122 and the broadband access server 112 are elements of a common state-of-the-art network and, therefore, their operation will not be discussed in greater detail in this description.

An IP (Internet Protocol) backbone 100 network of the operator comprises a terminating network node 104 terminating logical connections of user terminals 132 to 142. A logical connection may be, for example, an IP connection established between a given user terminal and the terminating network node 104. In the field of mobile telecommunication networks, the logical connections may also be referred to as bearer services. The terminating network node 104 is in this description referred to as Packet Data Network (PDN) System Architecture Evolution (SAE) Gateway (GW) node, i.e. PDN SAE GW in short, but features of the terminating network node 104 are not limited to that. The PDN SAE GW 104 is a standard network element of packet switched networks of a Long-Term Evolution (LTE) and a System Architecture Evolution (SAE) $3.9^{th}$ generation mobile communication system.

In other words, when any one of the user terminals 132 to 142 requests a packet data transfer service to a peer entity (to an Internet server or to a user entity), a logical connection (an IP connection) is established between the user terminal and the PDN SAE GW 104. At the establishment of the IP connection, the PDN SAE GW 104 provides the user terminal with an IP address to be used as a source or destination address of data packets transferred between the PDN SAE GW 104 and the user terminal. The PDN SAE GW 104 serves as an IP point-of-attachment for a mobile user terminal which may be moving within a radio access network of the mobile telecommunication system. In other words, data packets may be transferred between the mobile user terminal and the PDN SAE GW 104 through different base stations and sub-networks according to the movement of the mobile user terminal.

PDN SAE GW 104 provides a connection to the Internet 150 and other external networks. The IP backbone 100 further comprises a mobility management entity 102 handling mobility issues of the user terminals served by the network. Among other functionalities, the mobility management entity 102 implements selection of the sub-networks according to current location of the user terminal and controls the PDN SAE GW 104 to transmit data packets of the user terminal through an appropriate sub-network.

At least a part of the logical connection between the terminating network node 104 and the user terminal may be provided over a tunneled connection. In the example illustrated in FIG. 1, a tunneled connection is provided between the third private base station 128 and the terminating network node 104, i.e. the PDN SAE GW. Similar tunneled connection may be provided between the other private base stations 124 and 126 and the terminating network node 104, although it is not shown in FIG. 1. The tunneling may be implemented according to GPRS (General Packet Radio Service) tunneling protocol (GTP) used, for example, in GSM (Global System for Mobile Communications) and UMTS networks. The GTP is assumed as a commonly known tunneling protocol and, therefore, it is not described herein in greater detail.

A start-point network node of a tunneled connection, e.g. the private base station 128 in FIG. 1, encapsulates an IP data packet to be transferred over an IP connection into a GTP packet according to the GTP protocol. In other words, the start-point network node arranges the IP data packet into a payload portion of the GTP packet and generates GTP header information for the data packet and inserts the header information into a header portion of the GTP packet. The GTP packet is then transferred over a GTP tunnel to an end-point network node of the GTP-tunneled connection, e.g. the PDN SAE GW 104, wherein the GTP packet is decapsulated, i.e. the payload portion (the IP packet) is extracted from the GTP packet. Then, the IP packet is either forwarded towards the end-point of the IP connection or, if the end-point of the tunneled connection is also the end-point of the IP connection, the IP packet is extracted at the end-point network node.

As mentioned above, the IP connection is created between each user terminal 132 to 142 and the PDN SAE GW 104. A portion of the IP connection is arranged over a radio bearer between the user terminal and the serving private base station. In the example of FIG. 1, the other portion of the IP connection is arranged as a GTP-tunneled connection between the private base station and the network node 104 terminating the IP connection, i.e. PDN SAE GW. At this stage, it should be noted that portions of the logical connection may also be implemented as non-tunneled connections between network nodes between the user terminals 132 to 142 and the terminating network node 104. A similar connection may be established for every user terminal 132 to 142, i.e. PDN SAE GW 104 serves as a terminating network node for all the IP connections of the user terminals 132 to 142, i.e. all the data packets of the user terminals are transferred via the PDN SAE GW. This may result in problems in some cases.

Let us assume that a first user terminal 138 served by the third private base station 128 has established a first logical connection (IP connection, for example) with the PDN SAE GW node 104 acting as a terminating network node of the logical connection. Similarly, a second user terminal 142 served by the same private base station 128 has established a second logical connection with the PDN SAE GW 104. Then, the first user terminal 138 has a data packet to be transferred to the second user terminal 142. Because all the IP traffic of the user terminals 138 and 142 are conveyed through the terminating network node 104 of the logical connections, the data packet has to be transferred first to the terminating network node 104 over the first logical connection. Then, the terminating network node 104 extracts destination information contained in a header of the IP data packet, obtains knowledge that the destination address equals to the IP address of the second terminal 142, and sends the data packet towards the second user terminal 142 over the second logical connection through the same intermediate network nodes through which the data packet was sent towards the terminating network node 104 over the first logical connection. As a consequence, the data packet is transferred unnecessarily through the same intermediate network nodes, thereby wasting network resources, inducing load, reducing data rates and increasing latencies (particularly with asynchronous DSL connections) of every connection using the same intermediate network nodes as the first and the second logical connection. Similar problems may be evident in relation to connections between user terminals served by public base stations. At least part of the problem lies in the tunneled connections. Intermediate network nodes of tunneled connections simply forward the data packets to the end-points of the tunneled connection. As a consequence, the intermediate nodes are ignorant of the fact that there may be a possibility for optimizing the routing of data packets encapsulated for the tunneled connection.

According to an embodiment of the invention, a data packet originating from a first user terminal and related to a first logical connection which may include at least one tunneled connection is received by an intermediate network node of the first logical connection in a telecommunication network. The intermediate network node compares a destination address of the data packet to a service list including addresses of user terminals having data packets conveyed through the intermediate network node. If the destination address of the data packet matches with an address of a second user terminal included in the service list, the intermediate network node conveys the received data packet towards the second user terminal instead of relaying the data packet via a longer route through the terminating network node.

Figure 3:
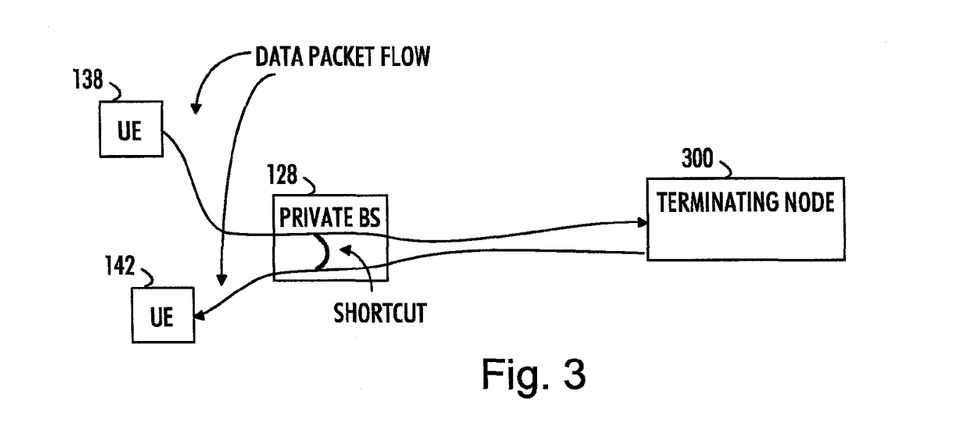
FIG. 3 illustrates an embodiment for providing a shortcut for data transfer in a private base station of the network illustrated in FIG. 1.

FIG. 3 illustrates an example of providing a shortcut for a data packet in the telecommunication network of FIG. 1. In this example, the intermediate network node is the third private base station 128. Let us again consider the case where the first user terminal 128 sends a data packet destined to the second user terminal 142. According to a conventional solution, the data packet is first conveyed through the third private base station 128 to the terminating network node 300 (PDN SAE GW 104 in this example) over the first logical connection. Then, the terminating network node 300 associates the data packet with the second logical connection and sends the data packet to the second user terminal 142 over the second logical connection.

According to an embodiment of the invention, the private base station 128 may store the IP addresses of the user terminals served by the private base station 128. The IP addresses may be stored in a service list including the IP addresses of the user terminals served by the private base station. In some cases, a user terminal may have a plurality of IP addresses, wherein each IP address is associated with a different logical connection. In such case, the service list may include all the IP addresses of the user terminal.

Upon reception of the data packet, the private base station 128 may check the destination address of the data packet and check the service list for a match with the destination address. If the service list includes an IP address matching with the destination address of the data packet, the private base station 128 may connect the first logical connection with the second logical connection to provide a shortcut connection between the first user terminal and the second user terminal. Thereafter, the private base station 128 may convey the data packet directly to the second user terminal 128 without conveying the data packet through the longer route via the terminating network node 300.

The embodiment described above is particularly advantageous in a case where user terminals served by a common private base station exchange data packets. In such cases, the data transfer between the user terminals does not cause any significant load neither to the DSL access network 120, the regional access network 110, nor to the IP backbone, because the private base station forwards received uplink data packets directly to a downlink connection towards a recipient user terminal. In an alternative embodiment, the above-mentioned procedure may be implemented in a public base station providing services to two user terminals exchanging data packets.

Figure 2:
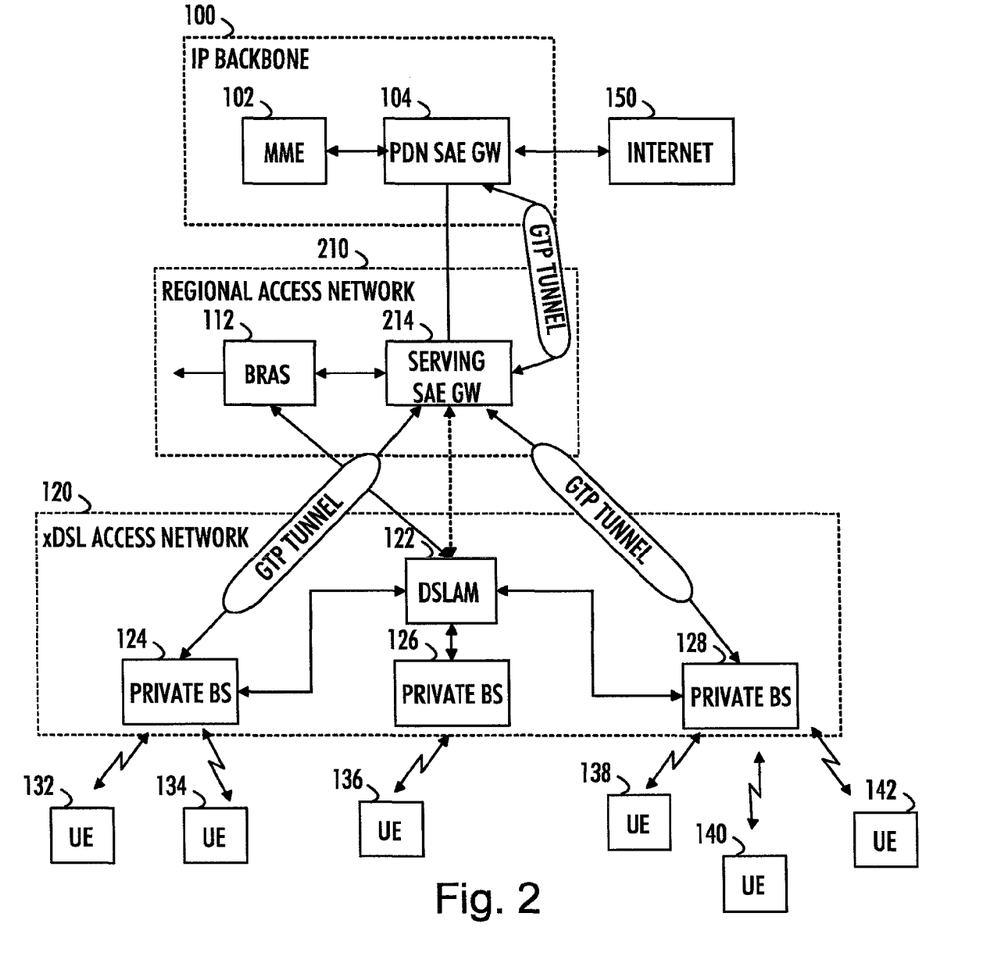
FIG. 2 illustrates another example of the network architecture for providing IP services to the user equipments.

FIG. 2 illustrates another embodiment of the network capable of supporting data packet shortcutting according to an embodiment of the invention. Network elements having the same reference numerals as those in FIG. 1 have similar functionalities.

FIG. 2 illustrates an additional network element referred to as a serving SAE GW node 214. The serving SAE GW 214 conveys the IP traffic between user terminals 132 to 142 and the terminating network node, i.e. the PDN SAE GW 104. The serving SAE GW 214 may be capable of processing encapsulated data packets, e.g. to analyse encapsulated contents of the data packets. The serving SAE GW node 214 may be connected between the PDN SAE GW 104 and the broadband access server 112 and be located at the edge of the regional access network 210. In practice, data packets may be transferred from the DSL access multiplexer 122 to the serving SAE GW node 214 through the broadband access server 112. The PDN SAE GW may still function as an IP point-of-attachment for the user terminals 132 to 142 served by the private base stations 124 to 128 connected to the xDSL access network 120. In other words, the logical connections may still be established between the user terminals 132 to 142 and the PDN SAE GW 104.

The xDSL access network 120 may be similar to that illustrated in FIG. 1. The flow of data packets between the user terminals 132 to 142 and the PDN SAE GW may be conveyed through the DSL access multiplexer 122, broadband access server 112, and serving SAE GW node 214. A tunneled connection may be provided between each private base station 124 to 128 and the serving SAE GW node 214. Furthermore, another tunneled connection may be provided between the serving SAE GW node 214 and the PDN SAE GW 104. The tunneled connections may again be implemented according to the GPRS tunneling protocol (GTP).

Figure 4:
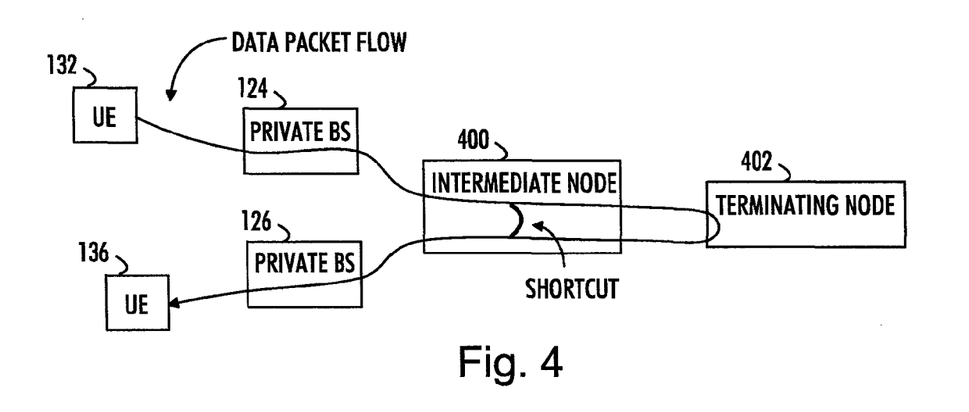
FIG. 4 illustrates an embodiment for providing a shortcut for data transfer in a network element of the network illustrated in FIG. 2.

In this implementation, the serving SAE GW node 214 functions as the intermediate network node providing a shortcut for data packets transferred between two of the user terminals 132 to 142. FIG. 4 illustrates the provision of the shortcut between user terminals 132 and 136 served by different (private) base stations 124 and 126, respectively, in the network of FIG. 2. As mentioned above, the intermediate network node 400 may be the serving SAE GW node 214, and the terminating network node 402, i.e. the network node terminating the logical connection, may once again be the PDN SAE GW 104. This embodiment is advantageous particularly in case data packets are transferred between two user terminals served by different base stations. The base stations serving the user terminals having the shortcut provided there between may be private base stations but at least one of the base stations may be a public base station as well. In fact, all the base stations may be public base stations.

Let us again consider the case in which a first user terminal 132 and a second user terminal 136 have established a first and a second logical connection, respectively, with the terminating network node 402. The logical connections may be called IP connections, SAE bearer services, etc. Similarly to the embodiment described above with reference to FIG. 3, the intermediate network node 400 may store the IP addresses of the user terminals having data packets transferred via the intermediate network node 400. The IP addresses may be stored in the service list of the type described above. Upon reception of the data packet, the intermediate network node 400 may check the destination address of the data packet and check the service list for a match with the destination address. If the service list includes an IP address matching with the destination address of the data packet, the intermediate network node 400 may connect the first logical connection with the second logical connection to provide a shortcut connection between the first user terminal 132 and the second user terminal 136. Thereafter, the intermediate network node 400 may convey the data packet directly to the second user terminal 136 without conveying the data packet through the longer route via the terminating network node 402.

The embodiment described above with reference to FIG. 4 is particularly advantageous in the sense that it provides a centralized shortcutting for a larger number of user terminals than the embodiment described with reference to FIG. 3. A much larger number of user terminals have their data packets transferred through the serving SAE GW node than through a single private base station and, therefore, the embodiment is able to provide data packet shortcutting for user terminals served by different base stations. Additionally, the embodiment is capable of supporting shortcutting in the event of handovers of the user terminals due to the higher location in the network hierarchy.

The embodiments described above with reference to FIGS. 3 and 4 may naturally be combined to provide flexibility for shortcutting. Let us assume a case in which two user terminals served by a common base station exchange data packets through a shortcut provided by the base station by connecting appropriate logical connections (radio bearers) of the user terminals. Then, one of the two user terminals moves further away from the base station so that the user terminal is handed over to another base station. Since the user terminals no more have the base station as a common node, the shortcut can no more be provided by the base station. The user terminals may, however, have another common node on a higher stage in the network architecture, and the common node may be located between the user terminals and a network node terminating the logical connections of the user terminals. This common node may then arrange a shortcut for the exchange of data between the user terminals, and the shortcut may be provided as described above with reference to FIG. 4. As a consequence, the telecommunication according to this embodiment of the invention is still able to optimize the routing of data packets by providing a shortcut at the intermediate network node being the closest common node of the user terminals, i.e. a node transferring data packets of both user terminals and being located closest to the user terminals in the network architecture.

In general, there is provided a solution for providing a shortcut between two logical connections. Upon reception of a data packet related to a first logical connection and received from a first user terminal in a network node, the destination address of the data packet is extracted from the received data packet. If it is detected that the data packet is addressed to a second user terminal and that the data packet should be sent to the second user terminal over a second logical connection, it is checked whether or not there is an intermediate network node common to both the first and the second logical connections. That is, it is checked whether there is a common intermediate network node closer to the first and the second user terminals in the network architecture than a network node terminating the first and the second logical connections. If such intermediate network node is detected, a shortcut between the first and the second logical connections are established through the detected intermediate network node.

Next, an embodiment for providing a shortcut is described in more detail with reference to a signaling diagram illustrated in FIG. 5 and data packet formats illustrated in FIGS. 6A and 6B. The signaling diagram illustrates the flow of data packets between a network comprising a first user terminal UE1 sending data packets to a second user terminal UE2, the second user terminal UE2, an intermediate network node making the arrangements for providing the shortcut, and a terminating network node serving as an end-point for logical connections established between the terminating network node and the user terminals UE1 and UE2. Both user terminals UE1 and UE2 may have established one or more logical connections with the terminating network node and, therefore, have one or more IP addresses allocated by the terminating network node. Naturally, the same IP address may be used for multiple or even for all logical connections associated with a given user terminal. The intermediate network may be a network node between the end-points of the logical connections. Let us in this example assume that the intermediate network node is between (a) base station(s) serving the user terminals UE1 and UE2 and the terminating network node. Let us further assume that the intermediate network node sends and receives data packets through tunneled connections. The tunneled connections are in this description considered broadly to include also equivalent data-carrying mechanisms such as Multi Protocol Label Switching (MPLS) or any other equivalent mechanism.

In S1, UE1 sends a data packet addressed to UE2 first to the intermediate network node. There may be several nodes between UE1 and the intermediate network node, even though it is not illustrated in FIG. 5. A format of the data packet sent by UE1 is illustrated in FIG. 6A. The user terminal may transmit the data packet as an IP packet comprising a header and payload data. The header may comprise an IP header of 20 bytes in length and a transport and application protocol header of 20 bytes in length. The IP header may comprise 12-byte Ipv4 header including IP version number, service type, error checksum bits, etc. Obviously, the Ipv4 header may be replaced by an Ipv6 header in case the network supports IP protocol version 6. Furthermore, the IP header comprises a source address (IP address of UE1) and a destination address (IP address of UE2 to which the data packet is addressed). The transport and application protocol header may comprise User Datagram Protocol (UDP) header defining application port numbers for both source port and destination port, for example, and Real-time Transport Protocol (RTP) header comprising a version number, a sequence number identifying the data packet in a data packet sequence, a time stamp for synchronization and for measuring packet arrival jitter, etc. The source port address identifies the address of the application that initiated the conversation. Correspondingly, the destination port address identifies the address of the recipient of that conversation.

Figure 5:
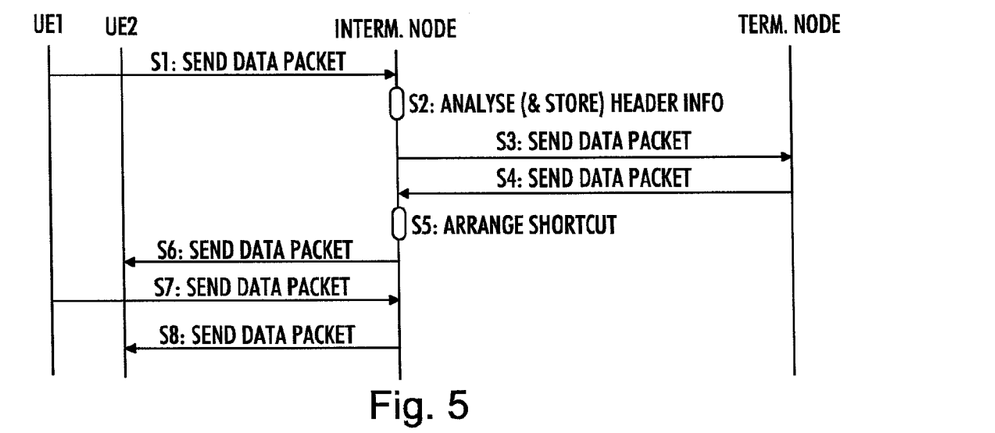
FIG. 5 illustrates a signaling diagram for providing a shortcut for data transfer in an intermediate network node according to an embodiment of the invention.
Figure 6A:
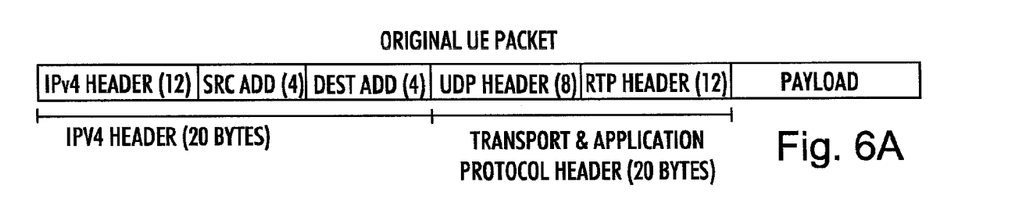
FIG. 6A illustrates the format of a data packet transmitted by a user terminal.
Figure 6B:
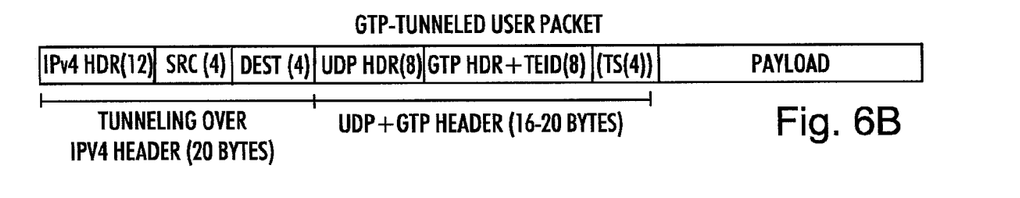
FIG. 6B illustrates the format of the data packet of FIG. 6A after encapsulation for tunneling.

The UE data packet is received by a network node acting as a start-point of a tunneled connection (not shown in FIG. 5). The network node formats the received UE packet into a format suitable for transfer over a tunneled connection. If the tunneling is provided according to the GTP, the reformatted data packet may have the format illustrated in FIG. 6B. The GTP-tunneled data packet may comprise a header and a payload portion including the original data packet illustrated in FIG. 6A. In other words, the network node has encapsulated the data packet into the payload portion of the GTP-tunneled data packet to be transferred over the tunneled connection. The header of the GTP-tunneled data packet may comprise the Ipv4 header, source and destination addresses, and a UDP header similar to those described above except for that the source address represents an IP address of the network node at the start-point of the tunneled connection, and the destination address represents an IP address of a network node at the end-point of the tunneled connection. Additionally, the header of the GTP-tunneled data packet includes a GTP header and an optional time stamp. The GTP header includes a tunnel end-point identifier (TEID) identifying the GTP tunnel through which the data packet is to be transferred. The TEID may also be used as an identifier of the logical connection.

Then, the network node sends the GTP-tunneled data packet towards the intermediate network node. Upon reception of the data packet, the intermediate network node analyses the header information of the received data packet in S2. In more detail, the intermediate network node may read the destination address from the received data packet. The read destination address may be the destination address indicating the final destination of the payload of the data packet. That is, if the data packet is an encapsulated GTP-tunneled data packet, the intermediate network node may check the payload portion, i.e. the original user packet, for the final destination address. Then, the intermediate network node may compare the read destination address with a stored service list including the IP addresses of the user terminals having data packets conveyed through the intermediate network node. If the destination address of the data packet matches with an IP address stored in the service list, the intermediate network node detects a possibility for arranging a shortcut between logical connections of UE1 and UE2. However, the intermediate network node may not have knowledge which two logical connections should be connected to provide the shortcut at this stage. As mentioned above, UE1 and UE2 may have multiple logical connections, and the intermediate network node may not necessary know which of the logical connections of UE2 is related to the logical connection of UE1, over which the data packet is being transferred.

Therefore, the intermediate network node may read and store at least part of the header information of the received data packet in S2 and send the data packet towards the terminating network node in S3. In particular, the intermediate network node may read and store a 5-tuple of the data packet, the 5-tuple comprising the source and destination IP addresses, protocol identifier, and source and destination port numbers. The stored 5-tuple serves as a packet identifier for the data packet. Additionally, the intermediate network node may insert a shortcut preparation indicator to the data packet sent to the terminating network node. The shortcut preparation indicator may inform the terminating network node that the intermediate network node is preparing a shortcut for the logical connection, over which the data packet is being transferred.

The terminating network node, on the contrary, knows which logical connections are mapped together, i.e. which uplink logical connection of UE1 is related to which downlink logical connection of UE2. As a consequence, the terminating network node sends the received data packet towards UE2 over an appropriate logical connection in S4. Before that, the terminating network node may have decapsulated the received data packet and re-encapsulated it according to the tunneling protocol (GTP) related to the logical connection with UE2. For example, the terminating network node may change at least the source and destination addresses and the TEID value of the header of the GTP-tunneled data packet to correspond the appropriate tunnel.

Furthermore, the terminating network node may extract the shortcut preparation indicator from the received data packet and check, whether or not the shortcut preparation is allowable. If the shortcut preparation is allowable, the terminating network node may insert to the data packet transmitted towards UE2 information acknowledging the shortcut preparation. On the other hand, if the shortcut preparation is not allowable, the terminating network node may insert to the data packet transmitted towards UE2 information denying the shortcut preparation. Accordingly, the terminating network node may include in the data packet either a shortcut-preparation-approved message or a shortcut-preparation-denied message. Alternatively, the shortcut preparation indicator and the acknowledgment/denial may be transmitted as separate signaling information.

In the embodiment in which the intermediate network node requests from the terminating network node a permission to arrange the shortcut, it is possible to selectively disable the shortcut preparation, if desired.

Since data packets of the two inter-related logical connections are conveyed through the intermediate network node, the intermediate network node receives the data packet from the terminating network node. Then, the intermediate network node may extract the information related to the shortcut preparation request. If the information indicates that the shortcut preparation is denied by the terminating network node, the intermediate network node ceases the shortcut preparation and conveys the following data packets received over the logical connection related to the originally received data packet to the terminating network node. On the other hand, if the information indicates that the terminating network node has approved the shortcut, the intermediate network node proceeds with arranging the shortcut between the two logical connections. Then, the intermediate network node may analyse the 5-tuple of the received data packet and detect that the 5-tuple matches with the 5-tuple stored previously in S2. In other words, the intermediate network node detects that the data packet received from the terminating network node is the same data packet analysed in S2. Then, the intermediate network node arranges a shortcut between the two logical connections in S5 by connecting an uplink direction of the first logical connection related to UE1 to the downlink direction of the second logical connection related to UE2.

Thereafter, the intermediate network node may send the data packet received from the terminating network node to UE2 in S6. Now that the intermediate network node has arranged the shortcut between UE1 and UE2 for the service in which data is transferred at least from UE1 to UE2, the intermediate network node may convey data packets received from UE1, addressed to UE2, and related to the service directly towards UE2 without the requirement of conveying the data packets through the longer rout via the terminating network node. Consequently, the intermediate network node receives in S7 another data packet from UE1, wherein the data packet is addressed to UE1, and conveys the data packet received in S7 directly to UE2 in S8.

Accordingly, the 5-tuple stored in a memory unit of the intermediate network node serves as a link between the two logical connections that should be connected together in order to provide a shortcut for data packets transferred from UE1 to UE2. The 5-tuple of the data packet typically remains the same regardless of the link direction (uplink or downlink) and, as a result, the intermediate network node is capable of detecting the reception of the same, previously received data packet. With the knowledge of the identifiers of the logical connections, e.g. TEID values contained in the GTP-headers of all the data packets processed by the intermediate network node, and the link between the two logical connections through the detected matching 5-tuple, the intermediate network node has knowledge of the two logical connections to be connected to provide the shortcut.

As mentioned above, the intermediate network node may be the serving SAE GW node 214 illustrated in FIG. 2 but also any other network node between the end-points of the logical connection. In case the intermediate network node is the base station providing a shortcut between logical connections of two user terminals served by the base station, the base station may connect radio bearers of the two logical connections. Instead of using TEID values as identifiers of the logical connections, the base station may use radio bearer identifiers (RBIDs) or corresponding identifiers to identify and connect the logical connections. Additionally, data packets received from the direction of the user terminals are typically not encapsulated, because the connection between the user terminals and the base station is not a tunneled connection. The base station may, however, encapsulate the data packets transferred towards the network in case the base station is a startpoint of a tunneled connection. In such case, the base station maps the radio bearers to appropriate tunnels when sending a data packet from the user terminals towards the network and tunnels to appropriate radio bearers when sending data packets from the network towards the user terminals.

As an alternative for the shortcut provision initiated by the intermediate network node of the logical connection, the terminating node of the logical connection may initiate the provision of the shortcut. The terminating network node may be configured to check for a network node common to both the first and the second logical connections and instruct the intermediate network node to arrange a shortcut between the first and the second connections, if a common intermediate network node has been detected. In more detail, the terminating network node terminating both the first and the second logical connections may receive a data packet over the first logical connection and detect that the data packet includes no message from an intermediate indicating the preparation of a shortcut. Then, the terminating network node may check for an intermediate network node common to both the first and the second logical connections. This information may be acquired, for example, from routing tables of the logical connections or in another way. Upon detection of such intermediate network node which conveys data packets of both the first and the second logical connections, the terminating network node may send to the intermediate network node a message instructing the intermediate network node to establish the shortcut between the first logical connection and the second logical connection. Additionally, the terminating network node may include identifiers of the first and the second logical connection. The identifiers may be TEID values of tunneled connections or any other identifiers associated with the logical connections.

In some cases, it may be necessary to avoid shortcutting for some or all user terminals. The reason may be, for example, any function in the PDN SAE GW related to the user plane traffic, such as lawful interception or charging. Another example is a case in which a user terminal roams in a network of an operator different from a home operator of the user terminal. In such case, the shortcut forwarding may be disabled when the user terminal resides in visited networks. In case the shortcut forwarding is disabled temporarily or for some specific user terminals, the intermediate network node may get information concerning the disabling via control signaling information or through management interfaces. The information may contain identifiers of user terminals for which the shortcut forwarding should be disabled and/or instructions to disable the shortcut forwarding completely.

Figure 7:
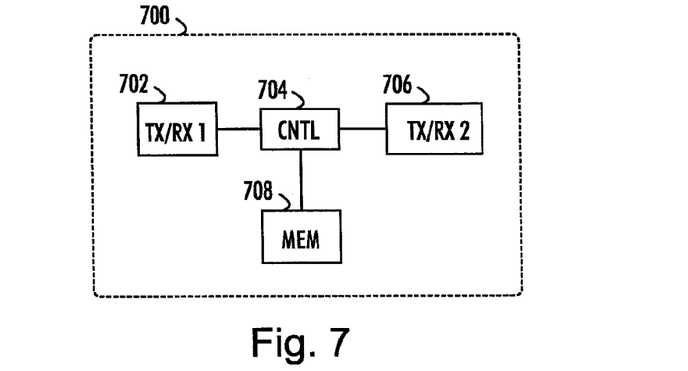
FIG. 7 illustrates a block diagram of an apparatus according to an embodiment of the invention.

FIG. 7 is a block diagram of an apparatus 700 according to an embodiment of the invention for providing a shortcut between two logical connections. Both logical connections may include at least one tunneled connection. The apparatus may be an intermediate network node operating in a way described above. The intermediate network node may be a network node of the telecommunication network illustrated in FIG. 1 or FIG. 2. The apparatus 700 may comprise a first interface 702 to provide a communication link towards user terminals having data transferred through the apparatus over one or more logical connections, a second interface 706 to provide another communication link towards other end(s) of the logical connections, and a processing unit 704 controlling the operations of the apparatus 700. The processing unit 704 may be configurable by software or an ASIC (Application-Specific Integrated Circuit) implementation, for example. The apparatus 700 may further comprise a memory unit 708 storing transmission parameters and transmission configurations related to data transfer in the telecommunication network.

Next, a process for transferring data packet according to an embodiment of the invention in a telecommunication providing wireless communication services to user terminals through one or more private base stations connected to the telecommunication network will be described with reference to a flow diagram illustrated in FIG. 8. The process may be implemented as a computer process for configuring the processing unit 704 described in FIG. 7. Accordingly, the process may be executed in the intermediate network node described above. The process starts in block 800.

In block 802, IP addresses of user terminals having data packets transferred through the intermediate network node are stored into a service list in the intermediate network node. The IP addresses of the served user terminals may be stored among ordinary context data related to the logical connection (SAE bearer). In case there is a separate IP address for each logical connection and a given user terminal has established a plurality of logical connections, the intermediate network node may store an IP address for every logical connection. The intermediate network node may acquire an IP address of the logical connection through standard control signaling during the establishment of the logical connection and/or a handover procedure. If the IP address is not included in the control-plane signaling for setting up the logical connection, the intermediate network node may acquire the IP address from any data packet transferred over the logical connection. The IP address may be obtained by performing an IP look-up for the data packet, i.e. by reading a source or a destination IP address from the data packet depending on whether the user terminal is sending or receiving the data packet. In case the intermediate network node received the data packet from the user terminal, the source IP address is read and stored. On the other hand, if the data packet is transferred to the direction of the user terminal, i.e. downlink, the destination IP address of the data packet is read. In case the data packet is encapsulated, the intermediate network node may be configured to read the source/destination address from the payload portion of the encapsulated data packet. Now, the intermediate network node has stored IP addresses of each logical connection of the served user terminals and linked each stored IP address to a given logical connection.

In block 804, the intermediate network node receives a data packet from a first user terminal over a first logical connection. In block 806, the final destination IP address of the received data packet is compared with IP addresses stored in the service list, and in block 808 it is checked whether or not there is a match between the final destination address of the received data packet and an IP address in the service list, i.e. does the destination address equal to an IP address contained in the service list. If the destination address does not match with any of the IP addresses stored in the service list, the process moves to block 810 in which the data packet is sent to the next network node in the chain towards the destination address, i.e. the data packet is processed and sent in a conventional way.

On the other hand, if the destination address matches with an IP address of a second user terminal having its IP address stored in the service list, the intermediate network node initiates the preparation of a shortcut in the connection between the first user terminal and the second user terminal in block 812. Related to the preparation of the shortcut, the intermediate network node stores at least part of the header information of the data packet in block 814. In more detail, the 5-tuple of source IP address, destination IP address, protocol identifier, source port, and destination port may be stored into the memory unit of the intermediate network node. The 5-tuple may be obtained from the original (encapsulated) data packet illustrated in FIG. 6A. As indicated above, the source port address and the destination port address may be obtained from the UDP header field, the protocol identifier from the Ipv4 header field, and the source and the destination IP addresses from the corresponding address fields. The stored 5-tuple may be linked to an identifier of the first logical connection. The identifier may be a TEID value, for example. Then, the data packet is sent to the terminating network node over the first logical connection in block 816.

In block 818, a data packet is received in the intermediate network node from the direction of the terminating network node over a second logical connection. In block 820, the header information of the data packet received in block 818 is compared with the header information stored in block 814. In more detail, the stored 5-tuple may be compared with the corresponding 5-tuple of the received data packet. In block 822, it is determined whether or not the header information matches with the stored header information, i.e. whether or not the data packet is indeed the same data packet received previously over the first logical connection in block 804. If it is determined that the header information of the data packet received in block 818 does not match with any stored header information, the process moves to block 824 in which the received data packet is simply sent toward the destination address specified in the data packet.

On the other hand, if it is determined in block 822 that the header information of the data packet received in block 818 matches with the header information stored in block 814, the process moves to block 826 in which the intermediate network node connects the first logical connection with the second logical connection to provide a shortcut between the first and the second user terminals. In more detail, the intermediate network node links the identifier of the first logical connection to the identifier of the second logical connection. Additionally, the data packet received in block 818 is sent to the second user terminal over the second logical connection.

After the shortcut connection has been arranged, the intermediate network node conveys in block 828 data packets received from the first user terminal over the first logical connection, and addressed to the second user terminal, directly toward the second user terminal over the second logical connection. In other words, when the intermediate network node receives a data packet addressed to the second user terminal from the first user terminal over the first logical connection, the intermediate network node detects the link between the first and the second logical connections and, therefore, does not relay the data packet towards the terminating network node but towards the second user terminal over the second logical connection. Data packets received over other logical connections (even from the first user terminals) may be relayed towards the terminating network node, unless there is a shortcut arranged for the logical connection in question.

The steps and related functions described above in FIG. 8 are in no absolute chronological order, and some of the steps may be performed simultaneously or in an order differing from the given one. Other functions may also be executed between the steps or within the steps and other signaling messages may be sent between the disclosed messages. Some of the steps or part of the steps may also be replaced by a corresponding step or part of the step. The operations related to the intermediate network node illustrate a procedure that may be implemented in one or more physical or logical entities.

Figure 8:
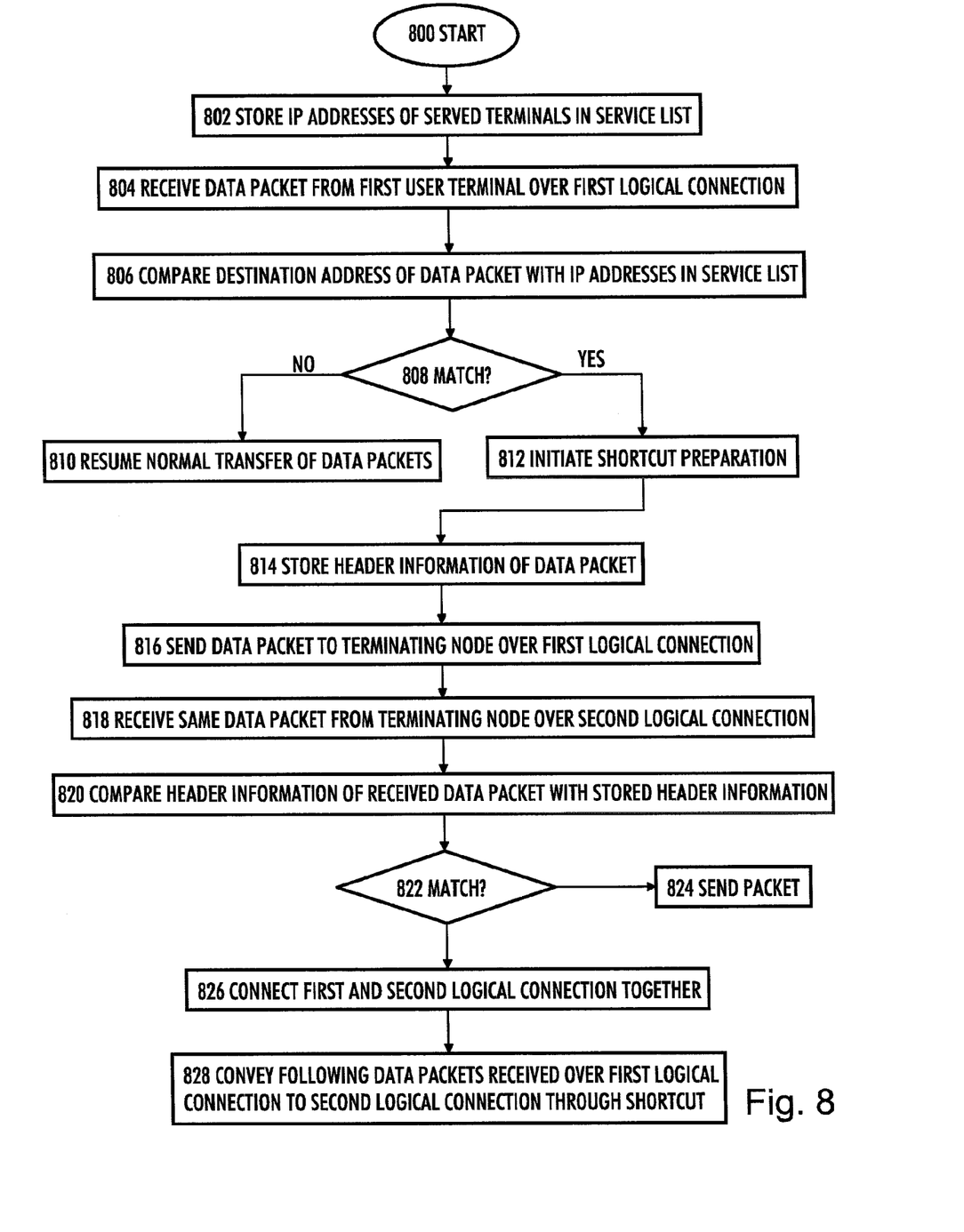
FIG. 8 is a flow diagram illustrating a process for rearranging data transfer according to an embodiment of the invention in a telecommunication network.

The method described in FIG. 8 may also be carried out in the form of a computer process defined by a computer program. The computer program may be in a source code form, an object code form, or in some intermediate form, and it may be stored in some sort of a carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to the telecommunication networks defined above but also to other suitable telecommunication systems. The protocols used, the specifications of mobile telecommunication systems and networks, their network elements and user terminals, develop rapidly.

Such development may require extra changes to an embodiment. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   receiving, in an intermediate network node of each a first logical connection associated with a first user terminal and a second logical connection associated with a second user terminal in a telecommunication network, a data packet transferred over the first logical connection and originating from the first user terminal, wherein the first logical connection and the second logical connection comprise at least one GTP-tunneled connection;
   comparing a destination address of the received data packet to a service list including addresses of user terminals having data packets conveyed through the intermediate network node, wherein each of the addresses of user terminals is associated with a specific logical connection established between the user terminals and a terminating network node within a core network of the telecommunication network;
   inserting, by the intermediate network node into the data packet, a shortcut preparation indicator indicating to the terminating network node that the intermediate network node is preparing a shortcut for the first logical connection;
   receiving, from the intermediate network node, an acknowledgement for the shortcut preparation indicator, the acknowledgement including a shortcut-preparation-approved message or a shortcut-preparation-denied message; and
   conveying the received data packet towards the second user terminal over the second logical connection using values in tunnel header information associated with the at least one GTP-tunneled connection, if the destination address of the data packet matches with the address of the second user terminal included in the service list.

2. The method of claim 1, further comprising:
   conveying the received data packet towards a terminating network node of the first logical connection, if the destination address is not included in the service list.

3. The method of claim 1, wherein the second user terminal has a second logical connection through the intermediate network node, wherein the first logical connection and the second connection include at least one tunneled connection, the method further comprising:
   arranging a shortcut for data transfer between the first user terminal and the second user terminal by connecting the first logical connection to the second logical connection in the intermediate network node.

4. The method according to claim 1, further comprising:
   determining, in the intermediate network node, the second logical connection with which the first logical connection is to be connected by conveying the data packet to the terminating network node, receiving the data packet from the terminating network node over the second logical connection, and connecting the first logical connection with the second logical connection to provide the shortcut between the first logical connection and the second logical connection.

5. The method of claim 4, connecting the first logical connection with the second logical connection further comprising:
   linking an identifier of the first logical connection to an identifier of the second logical connection in the intermediate network node.

6. The method according to claim 1, further comprising:
   storing at least part of header information of the received data packet;
   conveying the data packet towards the terminating network node through the first logical connection;
   receiving the data packet from the terminating network node through the second logical connection;
   comparing header information of the data packet received from the terminating network node with the stored at least part of the header information;
   connecting the first logical connection with the second logical connection in the intermediate network node, if the header information of the data packet received from the terminating network node matches with the stored at least part of the header information; and
   conveying, in the intermediate network node, received data packets addressed to be transferred between the first user terminal and the second user terminal directly towards the user terminal addressed in header information of each data packet as the destination of the data packet.

7. The method of claim 6, storing at least part of header information of the received data packet comprising: storing the following header information: the source address of the data packet, the destination address of the data packet, a protocol identifier of the data packet, the source port address, and the destination port address.

8. The method according to claim 1, further comprising:
   providing one or more internet protocol connections as logical connections between one or more user terminals and the terminating network node through the intermediate network node.

9. The method according to claim 1, wherein the intermediate network node is a private base station, the method further comprising:
   providing, by the private base station to the first user terminal and the second user terminals served by the private base station, a first radio bearer as a part of the first logical connection and a second radio bearer as a part of the second logical connection, wherein the first logical connection is associated with the first user terminal and the second logical connection is associated with the second user terminal;
   receiving the data packet from the first user terminal through the first radio bearer;
   comparing the destination address of the data packet to the service list; and
   conveying the received data packet towards the second user terminal through the second radio bearer, if the destination address of the data packet matches with the address of the second user terminal included in the service list.

10. The method according to claim 1, further comprising:
    comparing, in the intermediate network node located within the tunneled connection of the first logical connection, the destination address of the data packet encapsulated for transfer through the tunneled connection with the addresses included in the service list.

11. The method of claim 10, further comprising: performing an address look-up procedure for the data packet to obtain the destination address encapsulated into a payload portion of the encapsulated data packet.

12. The method according to claim 1, further comprising:
identifying the first logical connection and the second logical connection to be connected in order to provide the shortcut from tunnel end-point identifiers of the first logical connection and the second logical connection.

13. The method according to claim 1, further comprising:
selectively configuring the intermediate network node to disable the functionality of arranging of the shortcut for data transfer between the first user terminal and the second user terminal.

14. The method according to claim 1, wherein the method is carried out in a node of the tunneled connection.

15. A network node apparatus comprising the apparatus according to claim 14.

16. An apparatus comprising:
an interface to transmit and receive data packets as communication signals; and
a processing unit of an intermediate network node of each a first logical connection associated with a first user terminal and a second logical connection associated with a second user terminal in a telecommunication network, wherein the processing unit is configured to receive a data packet transferred over the first logical connection and originating from the first user terminal, wherein the first logical connection and the second logical connection comprise at least one GTP-tunneled connection,
compare a destination address of the data packet to a service list including addresses of user terminals having data packets conveyed through the intermediate network node, wherein each of the addresses of user terminals is associated with a specific logical connection established between the user terminals and a terminating network node within a core network of the telecommunication network,
insert into the data packet a shortcut preparation indicator indicating to the terminating network node that the intermediate network node is preparing a shortcut for the first logical connection,
receive, from the intermediate network node, an acknowledgement for the shortcut preparation indicator, the acknowledgement including a shortcut-preparation-approved message or a shortcut-preparation-denied message, and,
convey the received data packet towards the second user terminal over the second logical connection that is linked to the first logical connection using tunnel end-point identifier (TEID) values in tunnel header information associated with the at least one GTP-tunneled connection, if the destination address of the data packet matches with the address of the second user terminal included in the service list.

17. The apparatus of claim 16, wherein the processing unit is further configured to convey, through the interface, the received data packet towards a terminating network node of the first logical connection, if the destination address is not included in the service list.

18. The apparatus of claim 16, wherein the second user terminal has a second logical connection established through the intermediate network node, wherein the first logical connection and the second logical connection include at least one tunneled connection, and the processing unit is further configured to arrange a shortcut for data transfer between the first user terminal and the second user terminal by connecting the first logical connection to the second logical connection in the intermediate network node.

19. The apparatus according to claim 16, wherein the processing unit is further configured to determine the second logical connection with which the first logical connection is to be connected by conveying, through the interface, the data packet to the terminating network node, receiving, through the interface, the data packet from the terminating network node over the second logical connection, and connecting the first logical connection with the second logical connection to provide the shortcut between the first logical connection and the second logical connection.

20. The apparatus of claim 19, wherein the processing unit is further configured to connect the first logical connection with the second logical connection by linking an identifier of the first logical connection to an identifier of the second logical connection in the intermediate network node.

21. The apparatus according to claim 16, wherein the processing unit is further configured to store at least part of header information of the received data packet, to convey the data packet towards the terminating network node through the first logical connection, to receive the data packet from the terminating network node through the second logical connection, to compare header information of the data packet received from the terminating network node with the stored at least part of the header information, to connect the first logical connection with the second logical connection in the intermediate network node, if the header information of the data packet received from the terminating network node matches with the stored at least part of the header information, and to convey data packets received through the interface and addressed to be transferred between the first user terminal and the second user terminal directly towards the user terminal addressed in header information of each data packet as the destination of the data packet.

22. The apparatus of claim 21, wherein the processing unit is further configured to store as the at least part of header information of the received data packet the following header information: the source address of the data packet, the destination address of the data packet, a protocol identifier of the data packet, the source port address, and the destination port address.

23. The apparatus according to claim 16, wherein at least part of the logical connections between one or more user terminals and the terminating network node are internet protocol connections arranged through the intermediate network node.

24. The apparatus of claim 23, wherein the processing unit is further configured to perform an address look-up procedure for the data packet to obtain the destination address encapsulated into a payload portion of the encapsulated data packet.

25. The apparatus according to claim 16, wherein the intermediate network node is a private base station and the processing unit is further configured to provide to the first user terminal and the second user terminals served by the private base station, a first radio bearer as a part of the first logical connection and a second radio bearer as a part of the second logical connection, wherein the first logical connection is associated with the first user terminal and the second logical connection is associated with the second user terminal to receive the data packet from the first user terminal through the first radio bearer, to compare the destination address of the data packet to the service list, and to connect the first radio bearer to the second radio bearer to provide a shortcut between the first user terminal and the second user terminal, if the destination address of the data packet matches with the address of the second user terminal included in the service list.

26. The apparatus according to claim 16, wherein the intermediate network node is located within the tunneled connection, and wherein the processing unit is further configured to compare the destination address of the data packet encapsulated for transfer through the tunneled connection with the addresses included in the service list.

27. The apparatus according to claim 16, wherein the processing unit is further configured to identify the first logical connection and the second logical connection to be connected in order to provide the shortcut from tunnel end-point identifiers of the first logical connection and the second logical connection.

28. The apparatus according to claim 16, wherein the processing unit is further configured to selectively configure the intermediate network node to disable the functionality of arranging of the shortcut for data transfer between the first user terminal and the second user terminal.

29. The apparatus according to claim 16, wherein the intermediate network node is a node of the tunneled connection.

30. An apparatus comprising:
one or more processors; and
one or more memories including computer program code;
the one or more memories and the computer program code configured, with the one or more processors, to cause the apparatus to perform:
receiving, in an intermediate network node of a first logical connection associated with a first user terminal and a second logical connection associated with a second user terminal in a telecommunication network, a data packet transferred over the first logical connection and originating from the first user terminal, wherein the first logical connection and the second logical connection comprise at least one GTP-tunneled connection;
comparing a destination address of the data packet to a service list including addresses of user terminals having data packets conveyed through the intermediate network node, wherein each of the addresses of user terminals is associated with a specific logical connection established between the user terminals and a terminating network node within a core network of the telecommunication network;
inserting, by the intermediate network node into the data packet, a shortcut preparation indicator indicating to the terminating network node that the intermediate network node is preparing a shortcut for the first logical connection;
receiving, from the intermediate network node, an acknowledgement for the shortcut preparation indicator, the acknowledgement including a shortcut-preparation-approved message or a shortcut-preparation-denied message; and
conveying the received data packet towards the second user terminal over the second logical connection using tunnel header information associated with the at least one GTP-tunneled connection, if the destination address of the data packet matches with the address of the second user terminal included in the service list.

31. A computer program product embodied on non-transitory computer-readable storage medium bearing computer program instructions which, when loaded into an apparatus, execute a method comprising:
receiving, in an intermediate network node of each a first logical connection associated with a first user terminal and a second logical connection associated with a second user terminal in a telecommunication network, a data packet transferred over the first logical connection and originating from the first user terminal, wherein the first logical connection and the second logical connection comprise at least one GTP-tunneled connection;
comparing a destination address of the received data packet to a service list including addresses of user terminals having data packets conveyed through the intermediate network node, wherein each of the addresses of user terminals is associated with a specific logical connection established between the user terminals and a terminating network node within a core network of the telecommunication network;
inserting, by the intermediate network node into the data packet, a shortcut preparation indicator indicating to the terminating network node that the intermediate network node is preparing a shortcut for the first logical connection;
receiving, from the intermediate network node, an acknowledgement for the shortcut preparation indicator, the acknowledgement including a shortcut-preparation-approved message or a shortcut-preparation-denied message; and
conveying the received data packet towards the second user terminal over the second logical connection using tunnel header information associated with the at least one GTP-tunneled connection, if the destination address of the data packet matches with the address of the second user terminal included in the service list.

32. An apparatus comprising:
an interface to transmit and receive data packets as communication signals; and
a processing unit of a network node of a first logical connection associated with a first user terminal and a second logical connection associated with a second user terminal in a telecommunication network, wherein the processing unit is configured to receive a data packet transferred over the first logical connection and originating from the first user terminal, wherein the first logical connection and the second logical connection comprise at least one GTP-tunneled connection, wherein the data packet is addressed to the second user terminal, to check for an intermediate network node common and closer to both the first logical connection and the second logical connection than other nodes in the telecommunication network, to insert into the data packet a shortcut preparation indicator indicating that the network node is preparing a shortcut for the first logical connection, to receive an acknowledgement for the shortcut preparation indicator, the acknowledgement including a shortcut-preparation-approved message or a shortcut-preparation-denied message; and to arrange the shortcut between the first and the second logical connection using tunnel header information associated with the at least one GTP-tunneled connection, if the common intermediate network node has been detected.

33. A method comprising:
receiving, in a network node of a first logical connection associated with a first user terminal and a second logical connection associated with a second user terminal in a telecommunication network, a data packet transferred over the first logical connection and originating from the first user terminal, wherein the data packet is addressed to the second user terminal, wherein the first logical connection and the second logical connection comprise at least one GTP-tunneled connection;
checking for an intermediate network node common and closer to both the first logical connection and the second logical connection than other nodes in the telecommunication network;

inserting into the data packet a shortcut preparation indicator indicating that the network node is preparing a shortcut for the first logical connection;
receiving an acknowledgement for the shortcut preparation indicator, the acknowledgement including a shortcut preparation-approved message or a shortcut-preparation-denied message; and
arranging the shortcut between the first and the second logical connections using tunnel header information associated with the at least one GTP-tunneled connection, if the common intermediate network node has been detected.

* * * * *